United States Patent
Davis et al.

(10) Patent No.: US 8,244,674 B2
(45) Date of Patent: Aug. 14, 2012

(54) INTERACTIVE PEER DIRECTORY

(75) Inventors: Ken Davis, New Canaan, CT (US); Nir Polonsky, Ridgefield, CT (US); Girish Malangi, Bridgewater, NJ (US); Malini Vittal, San Diego, CA (US); Tirath Mehta, Norwalk, CT (US); Maria Patterson, Lilyfield (AU)

(73) Assignee: Gartner, Inc., Stamford, CT (US)

( * ) Notice: Subject to any disclaimer, the term of this patent is extended or adjusted under 35 U.S.C. 154(b) by 301 days.

(21) Appl. No.: 12/592,799

(22) Filed: Dec. 2, 2009

(65) Prior Publication Data

US 2010/0145937 A1     Jun. 10, 2010

Related U.S. Application Data

(60) Provisional application No. 61/201,618, filed on Dec. 10, 2008.

(51) Int. Cl.
*G06F 17/30* (2006.01)

(52) U.S. Cl. ........ 707/622; 707/706; 707/711; 707/748; 707/733; 707/967; 709/218; 709/219; 709/230

(58) Field of Classification Search .................. 709/218, 709/219, 230; 707/706, 711, 748, 622, 967, 707/733, 741, 999.107, 999.002
See application file for complete search history.

(56) References Cited

U.S. PATENT DOCUMENTS

| | | | |
|---|---|---|---|
| 5,983,214 A | 11/1999 | Lang et al. | |
| 6,029,161 A | 2/2000 | Lang et al. | |
| 6,078,928 A | 6/2000 | Schnase et al. | |
| 6,112,186 A | 8/2000 | Bergh et al. | |
| 6,175,842 B1 | 1/2001 | Kirk et al. | |
| 6,236,978 B1 | 5/2001 | Tuzhilin | |
| 6,236,980 B1 | 5/2001 | Reese | |
| 6,266,649 B1 | 7/2001 | Linden et al. | |
| 6,308,175 B1 | 10/2001 | Lang et al. | |
| 6,314,420 B1 | 11/2001 | Lang et al. | |
| 6,389,372 B1 | 5/2002 | Glance et al. | |
| 7,016,307 B2 | 3/2006 | Vasudev et al. | |
| 7,035,838 B2 | 4/2006 | Nelson et al. | |
| 7,043,443 B1 | 5/2006 | Firestone | |
| 7,047,202 B2 | 5/2006 | Jaipuria et al. | |
| 7,069,308 B2 | 6/2006 | Abrams | |
| 7,167,910 B2 | 1/2007 | Farnham et al. | |
| 7,177,880 B2 | 2/2007 | Ruvolo et al. | |
| 7,188,153 B2 | 3/2007 | Lunt et al. | |
| 7,249,123 B2 | 7/2007 | Elder et al. | |
| 7,269,590 B2 | 9/2007 | Hull et al. | |
| 7,275,102 B2 | 9/2007 | Yeager et al. | |
| 7,315,826 B1 | 1/2008 | Guheen et al. | |
| 7,359,894 B1 | 4/2008 | Liebman et al. | |

(Continued)

*Primary Examiner* — Leslie Wong
(74) *Attorney, Agent, or Firm* — Lipsitz & McAllister, LLC

(57) ABSTRACT

A system is provided for locating peers having a desired expertise. User profile information is stored in a profiles database. A search engine indexes the profiles database and appends appropriate profile tags to this information. A peer relevancy algorithm searches for candidate peers among the indexed user profile information. Weights are assigned to candidate peers based on different categories of the indexed user profile information, and peer matches are selected based on the assigned weights. In order to provide matches that are most likely to accept a connection request, data is maintained as to which potential peers have a history of accepting requests to connect and which have a history of refusing to connect. Potential matches are biased to favor those that have a tendency to accept connection requests. Contact information of requester and recipients are not disclosed until the recipient accepts the requester's connection request.

19 Claims, 6 Drawing Sheets

U.S. PATENT DOCUMENTS

| | | | |
|---|---|---|---|
| 7,451,161 B2 | 11/2008 | Zhu et al. | |
| 7,454,433 B2 | 11/2008 | Ebert | |
| 7,499,903 B2 | 3/2009 | Nevin et al. | |
| 7,512,628 B2 | 3/2009 | Chess et al. | |
| 7,657,907 B2 | 2/2010 | Fennan et al. | |
| 7,680,820 B2 | 3/2010 | Denoue et al. | |
| 7,917,503 B2 * | 3/2011 | Mowatt et al. | 707/723 |
| 2002/0087632 A1 | 7/2002 | Keskar | |
| 2002/0194018 A1 | 12/2002 | Scott | |
| 2003/0093294 A1 | 5/2003 | Passantino | |
| 2004/0015329 A1 * | 1/2004 | Shayegan et al. | 702/179 |
| 2004/0073918 A1 | 4/2004 | Ferman et al. | |
| 2005/0050227 A1 | 3/2005 | Michelman | |
| 2005/0240580 A1 | 10/2005 | Zamir et al. | |
| 2006/0085373 A1 | 4/2006 | Dhillion et al. | |
| 2006/0179112 A1 | 8/2006 | Weyer et al. | |
| 2006/0200434 A1 | 9/2006 | Flinn et al. | |
| 2007/0060109 A1 | 3/2007 | Ramer et al. | |
| 2008/0046555 A1 * | 2/2008 | Datta et al. | 709/223 |
| 2008/0104004 A1 * | 5/2008 | Brave et al. | 706/45 |
| 2008/0104030 A1 | 5/2008 | Choi et al. | |
| 2008/0215623 A1 | 9/2008 | Ramer et al. | |
| 2008/0288494 A1 | 11/2008 | Brogger et al. | |
| 2008/0294607 A1 | 11/2008 | Partovi et al. | |
| 2009/0018851 A1 | 1/2009 | Greenfield | |
| 2009/0100047 A1 | 4/2009 | Jones et al. | |
| 2010/0105315 A1 | 4/2010 | Albrett | |
| 2011/0113094 A1 * | 5/2011 | Chunilal | 709/204 |

* cited by examiner

INTERACTIVE PEER DIRECTORY

This application claims the benefit of U.S. Provisional Patent Application no. 61/201,618 filed on Dec. 10, 2008, the entire contents of which is incorporated herein by reference.

BACKGROUND OF THE INVENTION

The present invention relates to an interactive peer directory implemented on a digital computer. The directory provides for the online location of peers with expertise in a particular business or endeavor. Once qualified peers are located, connections to such peers can be requested for project, product and implementation advice and the like.

Various tools for arranging business introductions are known in the art. For example, J. Greenfield U.S. Patent Publication No. 2009/0018851 discloses a network that uses registration information of multiple parties along with a matching function to match two parties that have a business contact that both parties would benefit from if the parties were introduced. Procedures are provided to notify the parties of a potential match, and to facilitate communication between the parties if the introduction is accepted by the parties.

U.S. Pat. No. 7,454,433 to Ebert discloses a system for providing adaptive virtual communities. By determining a technical or business context of a particular user, the system is able to match that user with other users who are likely to be able to assist the user within that context.

U.S. Pat. No. 7,035,838 to Nelson et al. discloses methods and systems for organizing information stored within a computer network-based system. Documentation relating to a plurality of topics and a list of experts on a plurality of topics is stored in a centralized database. A user interface enables a user to search the database for a specific item of information by at least one of a work function, a functional category and a community.

Prior art systems, such as those referenced above, generally provide too many potential matches between a requester and available contacts. The requester will then have to sort through these many potential matches to attempt to find a match that will be most relevant. Such systems can waste the requester's time and may not result in the best match being found, since the requester may settle for a less relevant match instead of carefully considering each of the many potential matches presented. Moreover, once a match is selected by a requester, the individual associated with that match may not respond to a request by the requester to communicate. This can waste more time, as the requester may wait several days to hear back from the match, only to find that no response is ever received. The requester will then have to find another match, with no assurance that the individual associated with the new match will be likely to respond to a request to communicate.

It would be advantageous to provide improved apparatus and methods for searching for peers that can assist a user that requests a match (the "requester") in solving a business or technical problem. It would be further advantageous if such apparatus and methods would provide more relevant matches to the requester, to increase the likelihood that a helpful peer will be more quickly and efficiently found. It would be still further advantageous if potential matches presented to the requester comprise peers that are more likely than not to respond to a request to communicate with the requester.

The present invention provides an interactive peer directory that enjoys the aforementioned and other advantages.

SUMMARY OF THE INVENTION

In accordance with the invention, a peer directory system is provided. The system is implemented on a digital computer network. A user interface enables user profile information to be entered and stored in a profiles database. A search engine is adapted to append tags to the user profile information. The search engine can comprise, for example, a computer processor and software to implement a search function. A search index is associated with the search engine for storing tagged user profile information in an indexed form. A peer relevancy algorithm is associated with the search engine to search for candidate peers among the indexed user profile information stored in the search index. The peer relevancy algorithm assigns weights to candidate peers based on different categories of the indexed user profile information, and selects peer matches based on the assigned weights.

In an illustrated embodiment, a first weight is assigned to candidate peers who have a best initiative match with a user searching for peers. The "initiative" can be, for example, a project or venture that the user is currently working on for an enterprise such as an employer. A second weight is assigned to candidate peers who have a best vendor/product match with the user searching for peers. A third weight is assigned to candidate peers who have a best primary operating system (OS) match (e.g., Windows, Mac OS X, SunOS, Linux, Unix, etc.) with the user searching for peers. A fourth weight is assigned to candidate peers who have a best industry match with the user searching for peers. A fifth weight is assigned to candidate peers who have a best firm size match (e.g., size of employer by number of employees, sales revenue, etc.) with the user searching for peers.

The first, second, third, fourth and fifth weights can be summed across all tags for the candidate peers in order to provide a composite weight for each candidate peer. The candidate peers can then be sorted by their composite weights.

In a preferred embodiment of the invention, the search index stores information indicative of past connection responses for candidate peers. Based on this information, the peer relevancy algorithm provides either (a) a negative bias to candidate peers that have poor past connection responses, or (b) a positive bias to candidate peers that have good past connection responses.

The user interface may comprise a display processor for providing display information indicative of best matched peers and allowing information about the best matched peers to be viewed and filtered by a user searching for peers.

The peer relevancy algorithm can be implemented such that it is responsive to a request entered via the user interface to select a peer match for a requester. In such an embodiment, the algorithm will return peer matches to the requester via the user interface. The user interface can be implemented to enable the requester to request connection to one or more peers identified by the peer matches. A communications processor, responsive to a peer connection requested by the requester, may be provided for (i) generating a connection request message to the applicable peer, (ii) receiving a reply from said applicable peer, (iii) if the applicable peer accepts the connection, sending a connection acceptance to the requester with contact information for the applicable peer, and (iv) if the applicable peer fails to accept the connection, sending a connection rejection to said requester.

In a preferred embodiment, the connection request message discloses at least one of the requester's company, industry, role or a personal message from the requester without disclosing the identity of the requester. Contact information for the requester is disclosed to the applicable peer only if the connection is accepted.

Various additional features of the invention include the ability of the user interface to allow a user to filter peer matches by at least one of industry, firm size, country, job role, vendor and product/service category. The weights assigned to the various candidate peers based on different categories of the indexed user profile information can be configurable to allow, e.g., for the tuning of the weights due to present or future circumstances. The negative and positive biases provided to candidate peers based on their past connection response history can also be configurable, e.g., to increase or decrease the significance of the bias in choosing peer matches for presentation (e.g., display) to a requester.

A method is disclosed for connecting peers having common interests. The method enables user profile information to be collected. Tags are appended to the user profile information. Tagged user profile information is stored in a profiles database in an indexed form. The profiles database is searched to identify candidate peers in response to a request for a peer match. The identification of candidate peers is based on correlations between a requester's user profile information and user profile information for the candidate peers. Weights are assigned to the candidate peers, and peer matches are selected based on the assigned weights.

In an illustrated embodiment, the weights assigned to candidate peers are based on at least one of best initiative match, best vendor match, best product match, best primary operating system (OS) match, best industry match and best firm size match. The weights assigned to candidate peers are summed for each such peer. The candidate peers are sorted by their composite weights.

Information indicative of past connection responses for candidate peers can be maintained. Based on this information, a negative bias can be provided to candidate peers that have poor past connection responses, and a positive bias can be provided to candidate peers that have good past connection responses.

DETAILED DESCRIPTION OF THE INVENTION

Although the invention is described in connection with a preferred embodiment, it will be appreciated that numerous other embodiments and designs are possible as will be apparent to those skilled in the art.

In order to use the peer directory of the present invention, a user opts-in to the directory service via a user interface. The directory can reside on a server which is accessible via a network. Once the user is connected to the server, a user profile can be created, accessed and/or updated. The profile includes, for example, information relating to the product and/or vendor expertise of the user.

Once a profile is complete, a user can then use the inventive system to search the peer directory for peers with relevant product knowledge. Once suitable peers are found, a peer connection algorithm is used to initiate a connection to an identified peer through a network, such as via e-mail or the like. The connection may be made in an anonymous manner, through an intermediary. Bilateral consent to connect may be required, via the intermediary, prior to establishing communication between the user and the relevant peer(s).

Figure 1:
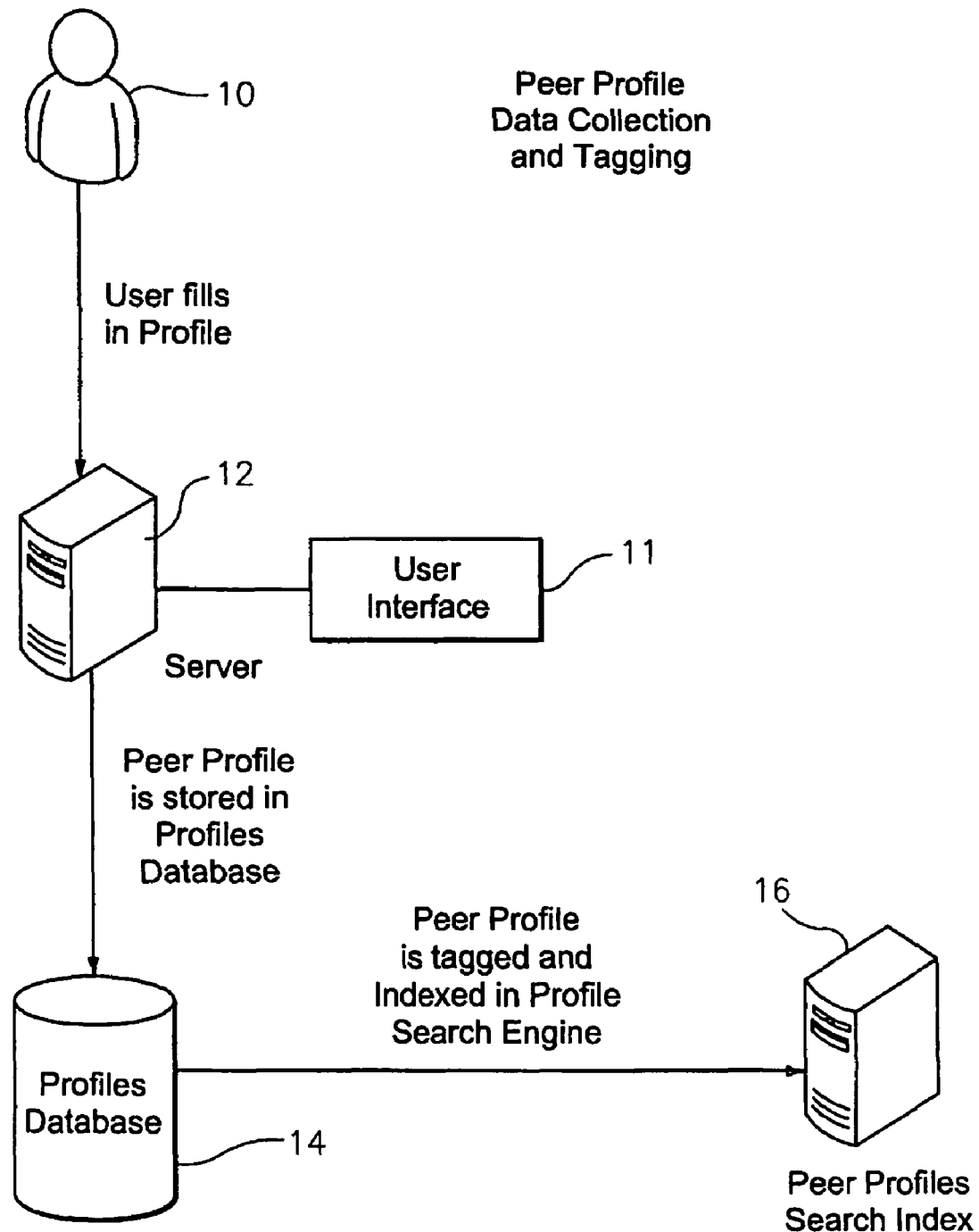
FIG. 1 is a block diagram of components of the inventive system relating to the collection and tagging of peer profile data.

FIG. 1 illustrates, in block diagram form, the main components of the inventive system that handle the collection and tagging of peer profile data. A user 10 fills in a profile template using a user interface 11. The user interface can comprise, for example, a graphic user interface (GUI) of a type well known in the art. A computer processor residing in a server 12 generates the template for the user to complete. The template can request, for example, demographic information, information about the user's employer and industry ("firmographic" data), information about the user's professional interests and the like ("about me" data), information identifying what the user is working on at his or her job, information about products and services of interest to the user, and other categories of information.

The user's responses to the template are used to create a "peer profile" for the user. The peer profile for the user is stored, together with the profiles of other system users, in a profiles database 14. A search engine resident in server 16 maps the peer profile data for the user with metadata tags useful for searching the data. The tagged data is then stored in a peer profiles search index 16. The search index 16 can be implemented in another server or computer accessible to the server 12.

Figure 2:
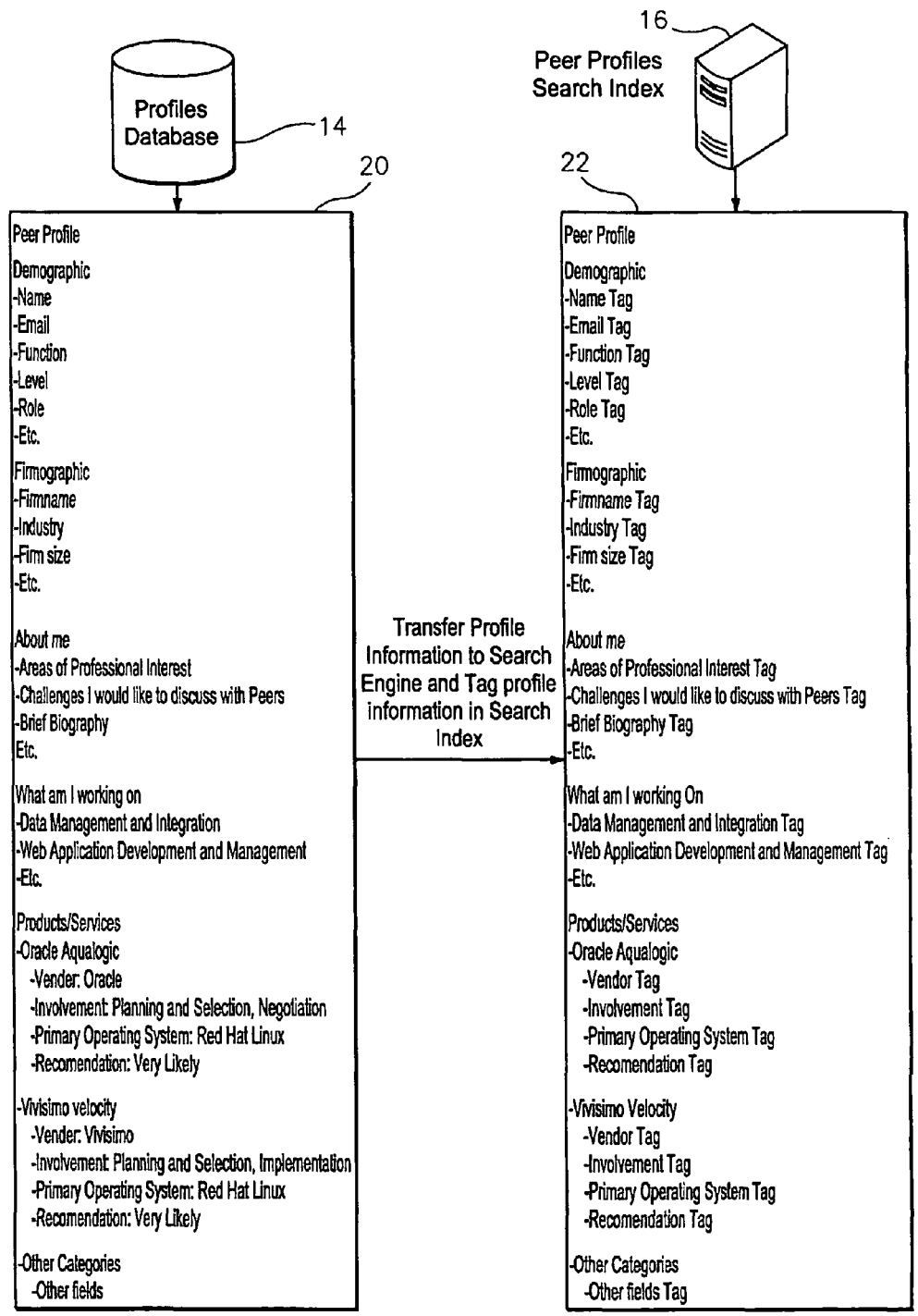
FIG. 2 is a block diagram illustrating example fields of the peer profile and example tags relating thereto.

FIG. 2 illustrates examples of the data that can be requested by the template for creating user profiles, as well as the tags that are provided for this data and stored in the peer profiles search index. As noted above, after entry via the user interface in response to the template, the user data ("peer profile") is stored together with the profiles of other system users in the profiles database 14. The stored data 20 includes, for example, demographic information for the user, including name, email address, job function, job level, role being served at job; and potentially other job related information. Also included in the stored data 20 is "firmographic" information relating to the user's employer, such as the firm name, industry, firm size, and the like. Another category of information included in the data 20 is "about me" information, including, for example, the user's areas of professional interest, challenges that the user would like to discuss with peers, a brief biography of the user, and similar data. A "what am I working on" category can include items such as the user's data management and integration projects, web application development and management responsibilities, and the like.

Another category of information that can be maintained for a user in the profiles database relates to products and services of interest to that user. For example, a user may be responsible for specifying, procuring and/or maintaining a business process management (BPM) suite and/or an enterprise search platform provided by a specific vendor, such as the Oracle Aqualogic suite or the Vivisimo Velocity search platform. This can be identified in the user's profile, together with pertinent information such as the vendor name, the user's involvement with the product, the primary operating system on which the suite is run and the user's recommendation for the product. Other categories of information can also be provided in the user's profile that will be useful in the search for a peer to assist the user in completing an assigned project.

The information in each user profile maintained in the profiles database 14 is transferred to a search engine (e.g., resident in server 16) that appends tag profile information to the user profile data. The tagged data is then stored in the peer profiles search index 16. In this manner, the search engine can search the tags stored in the peer profiles search index rather than searching all of the peer profile information itself in the profiles database. This design allows for much more efficient searching, higher relevancy and a quicker response when a requester queries the system for peer matches.

Figure 3:
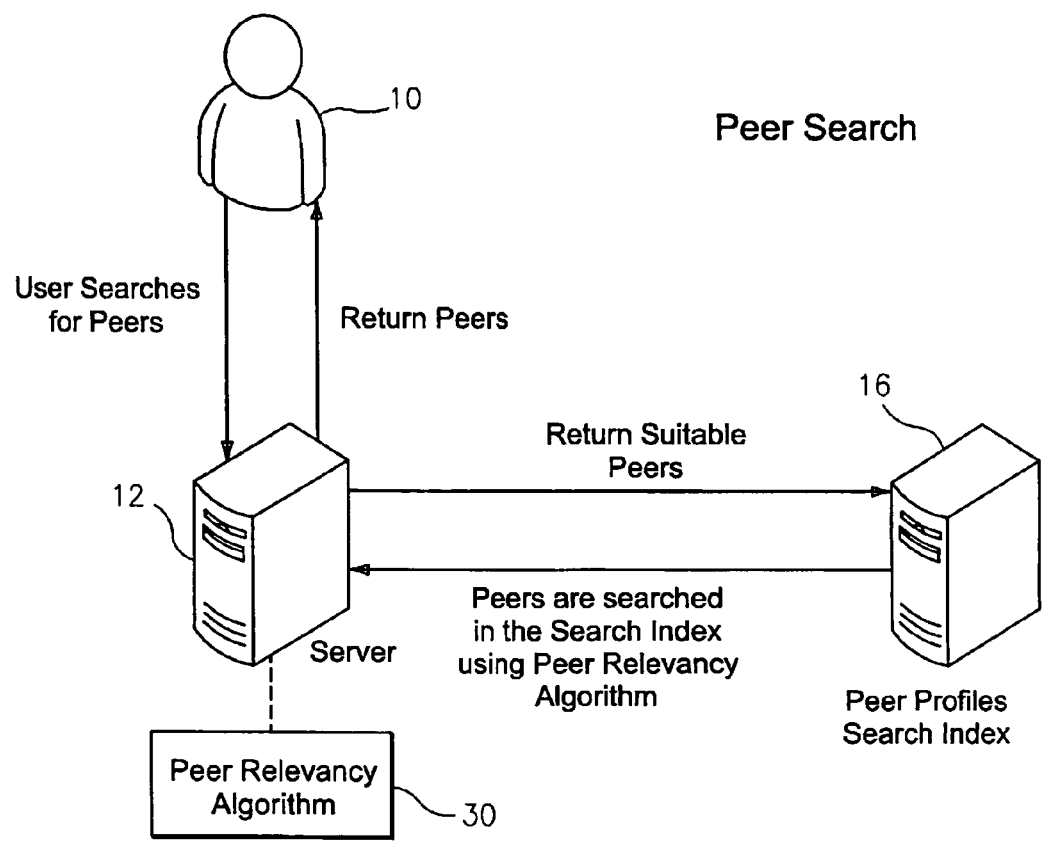
FIG. 3 is a block diagram of components of the inventive system relating to the search for peers.

FIG. 3 is a block diagram that illustrates a preferred embodiment of the peer search system. A user ("requester") 10 uses the user interface 11 (FIG. 1) to search for peers via the application implemented in server 12 which in turn connects with the search engine in server 16. The search engine can comprise software and/or hardware resident in the server 16. A peer relevancy algorithm 30 is a key component of the search engine, and is described in greater detail in the flowchart of FIG. 4.

When a user requests to be matched with potential peers via the user interface, the search engine searches the peer profiles search index 16 using the peer relevancy algorithm. Matches are located by the peer relevancy algorithm based on the tags stored in the peer profiles search index and their values, and a list of suitable peers is returned to the application at server 12. Server 12 then passes the matched peers to the user 10 via the user interface. In a preferred embodiment, the peer matches are displayed to the user via a computer display. The user interface allows the user to view each of the peer matches and to drill down for further information relating to each peer match. After reviewing the peer matches in this manner, the user can decide which match(es) would potentially be most helpful, and commence a procedure for contacting each such match.

Figure 4:
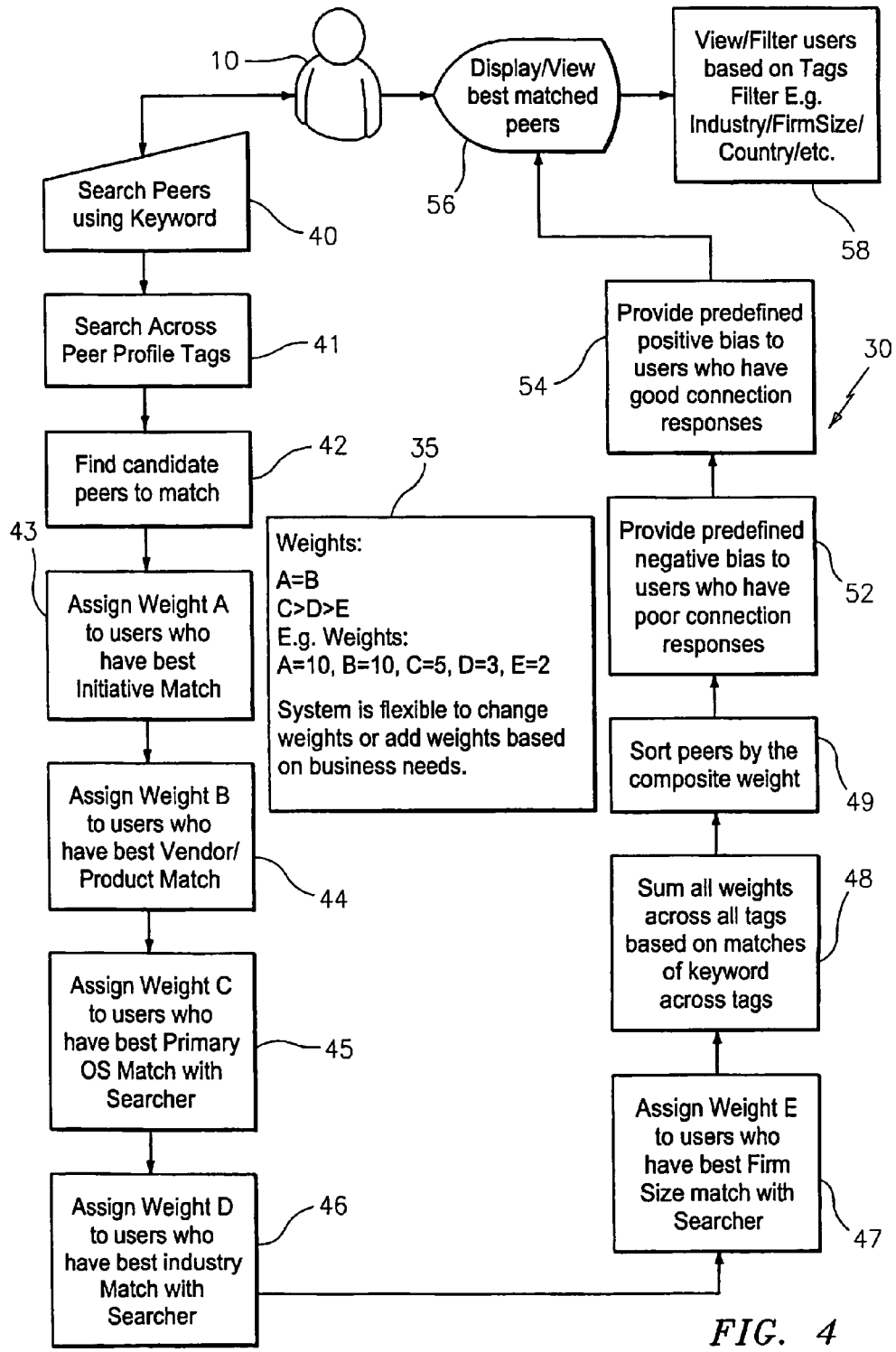
FIG. 4 is a flowchart of the peer relevancy algorithm.

The flowchart of FIG. 4 provides details on the matching and sorting of suitable peers on the search engine using tags and their values. The user 10 can commence a search for peers having profiles within the peer profiles search index in server 16 using keywords, as indicated at box 40. The keywords entered are used by the search engine to search across peer profile tags stored in the peer profiles search index 16, as indicated at box 41. The search engine finds candidate peers that match the search criteria (box 42) and begins assigning weights to the different candidate peers based on which ones have the best matches to the requester's needs in different categories. In particular, at box 43, a first weight "A" is assigned to candidate peers that have a best initiative match with the requester. The "initiative" can be, for example, a project or venture that the user is currently working on for an enterprise such as an employer.

At box 44, a second weight "B" is assigned to candidate peers who have a best vendor/product match with the requester. At box 45, third weight "C" is assigned to candidate peers who have a best primary operating system (OS) match (e.g., Windows, Mac OS X, SunOS, Linux, Unix, etc.) with the requester. A fourth weight "D" is assigned to candidate peers who have a best industry match with the requester, as indicated at box 46. At box 47, a fifth weight "E" is assigned to candidate peers who have a best firm size match (e.g., size of employer by number of employees, sales revenue, etc.) with the requester. Once all of the weights are assigned, they are summed across all tags based on matches of the keyword across the tags (box 48).

It should be appreciated that the categories of information to which weights are assigned at boxes 43-47 are not the only categories for which such weights can be assigned. Different categories of information can be added to or substituted for those shown, as will be apparent to those skilled in the art. Moreover, the system is flexible to change and/or add weights based on the needs of the business using the peer search system of the invention. In the illustrated embodiment, as shown at box 35 of FIG. 4, weight A=B, and weight C>D>E. For example, numerical weights can be assigned as follows: A=10, B=10, C=5, D=3, and E=2. As these are just examples, the weights actually assigned in a particular system may be different. Moreover, the system can be configurable to assign different weights to different categories as needed.

As an example of the weighting process, assume that a peer has the following profile:
Initiative: Application Architecture
Current Status Active
Description: PANAMA—fully redundant, zero downtime architecture.
Initiative: Data Management & Integration
Vendor Name SampleX Corporation
Current Status New
Description: Integration of CorporationA and CorporationB-.com site
Initiative: Web Application Development & Management|Edit|Remove
Vendor Name ExampleZ, Inc
Current Status Fully Implemented
Description: Implemented the CorporationB Search feature using ExampleZ Search Engine.
Product: SampleX Liquidlogic
Vendor Name: SampleX Corporation
Product/Service Category: Application Integration and Middleware Software
Your Involvement Planning and Selection, Negotiation, Implementation, Maintenance/Support
Primary Operating System: Red Hat Linux (Server)
Recommendation: Very Likely
Product: Windspeed
Vendor Name ExampleZ, Inc
Product/Service Category: Search and Information Access
Your Involvement Planning and Selection, Negotiation, Implementation, Maintenance/Support
Primary Operating System: Red Hat Linux (Server)
Recommendation: Confidential
Comments: Full Life Cycle Implementation with Corporation B.com application When a user types in a keyword to search for peers the system will try to match on the Initiative, Vendor Name, Description, Primary Operating System, Product/Service Category, Product fields (a/k/a tags), Comments, etc. across all peers. Depending on where the match occurs a different weight might be given. For example, if a user types in the keyword "Application" matches will result on:
Initiative: Application Architecture—assign a weight of 10
Initiative: Web Application Development and Management, assign a weight of 10
Product/Service Category: Application Integration and Middleware Software, assign a weight of 5
Comments: Full Life Cycle Implementation with CorporationB.com application, assign a weight of 1

All the weights are then summed to provide a unique score for each peer.

Once the weighting process is complete, each candidate peer will have a particular composite weight (the peer's "score"), and the peers are then sorted based on the composite weights as indicated at box 49. The sorted list of peers can then be presented to the requester. However, before presenting the list of peers to the requester, another series of steps can be provided to further increase the likelihood that a suitable match will be found.

Specifically, some users who have a good past connection history with peers may be more inclined to respond to a match request than others. The system can therefore keep track of the past history of users in responding to requests to connect to another user using the system. With this information, the system can provide a pre-defined negative bias to users that have poor connection responses, as indicated at box 52, and provide a pre-defined positive bias to users who have good past connection responses, as indicated at box 54. The bias can be implemented by simply increasing the weight assigned to good past responders and by decreasing the weight assigned to poor past responders. Such a bias can be added to or subtracted from the current weight for a given peer based on a fixed "bias" value or a percentage modification of the current weighting for each peer match. The bias for each peer match can then be presented to the requester using a flag or other indicia when the match is presented to the requester (e.g., via a computer display associated with the user interface) or by re-sorting the list of peer matches to account for the modified weight resulting from the bias. Alternatively, the sorting step 49 can be done subsequent to the bias steps 52 and 54, instead of prior to step 52 as shown in FIG. 4.

After the list of peer matches has been sorted, it is presented to the requester 10 using, e.g., a computer display or the like, as indicated at box 56. The requester can also use the user interface to view and/or filter proposed matches based on the tags. Such filtering can be done, for example, with respect to the requester's (and/or the peers') industry, firm size, country, job role, vendor, product service/category, etc. The requester can also filter for peers in his own company if he so chooses.

Figure 5:
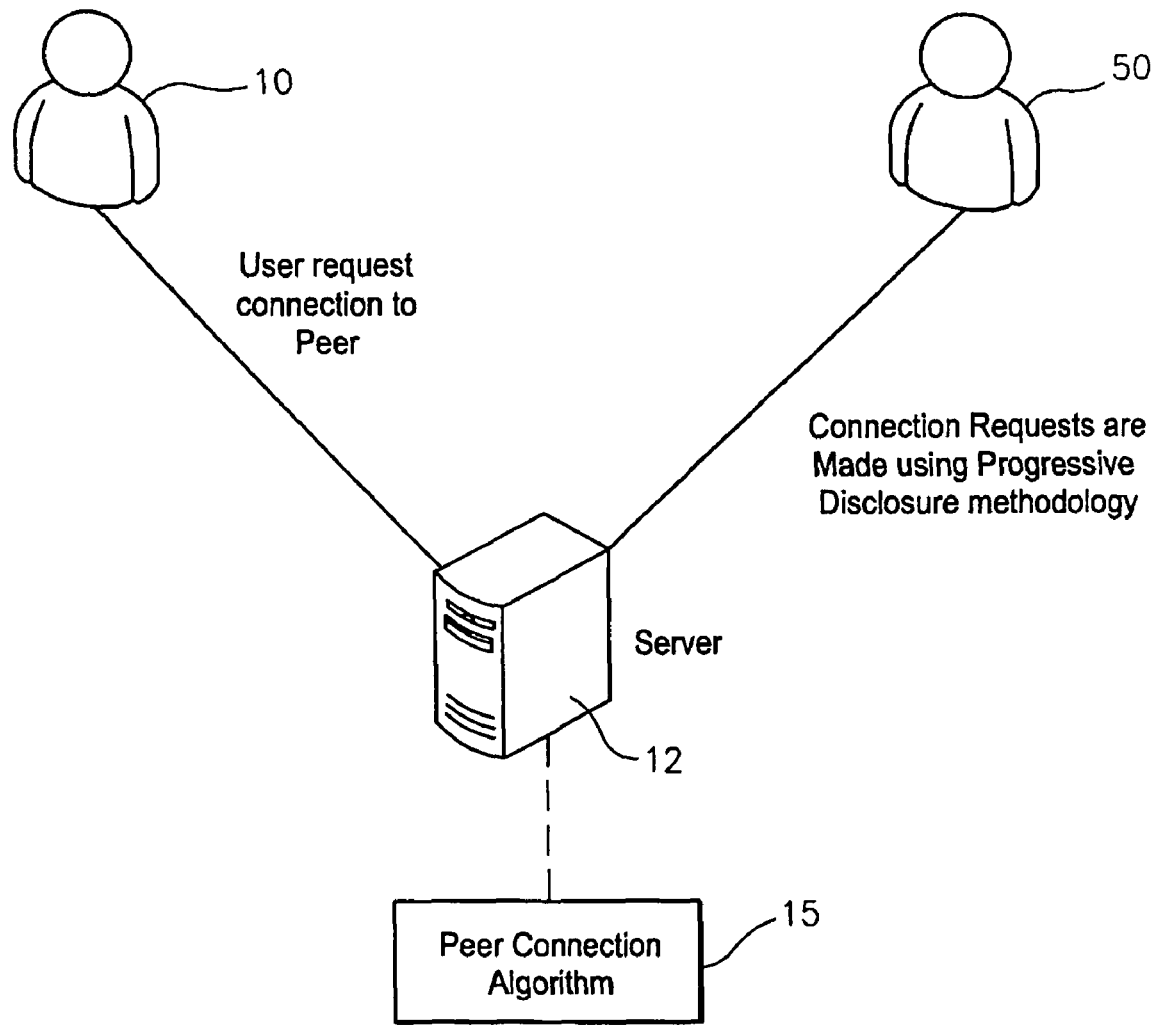
FIG. 5 is a block diagram of components of the inventive system relating to the peer connection algorithm.
Figure 6:
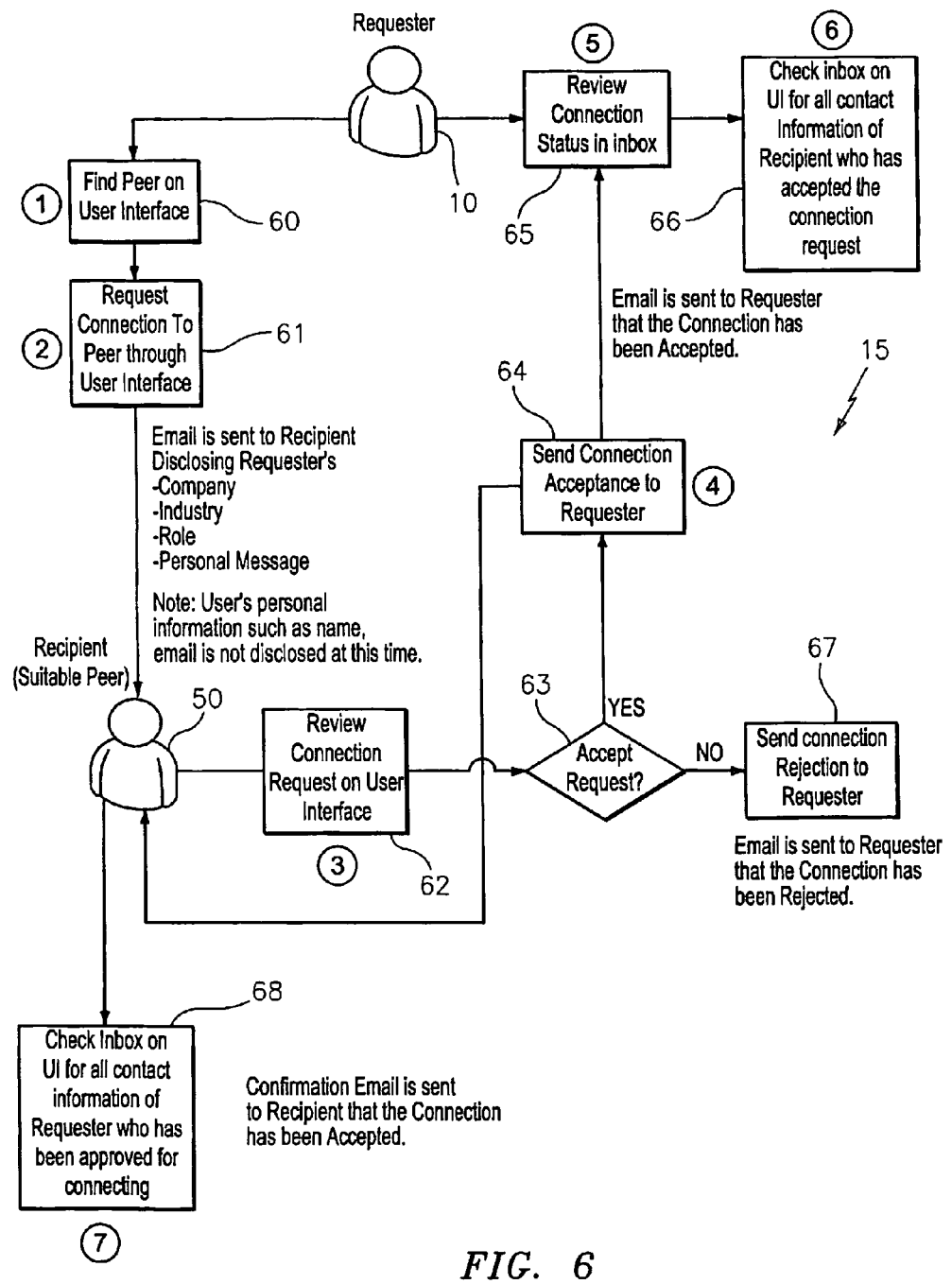
FIG. 6 is a flowchart of the peer connection algorithm.

FIG. 5 is a block diagram illustrating the connection of a requester to a peer. After going through the peer search process and receiving a list of the best matched peers, as described in connection with FIG. 4, the requester 10 can request connection to one or more peers that have been identified as potentially suitable matches. The request for a connection may be made to the server 12 via the user interface 11 (shown in FIG. 1). A peer connection algorithm, described in greater detail in FIG. 6, is associated with the server 12 in order to make a connection request to a particular peer 50 identified by the requester. The connection requests are made using a progressive disclosure methodology in accordance with the invention, in which the respective parties (peer and requester) only learn of the other's identity after certain requirements have been met.

As indicated in FIG. 6, the requester 10 first uses the user interface to find a potential peer to contact, as indicated at box 60. A request for a connection to that peer is then made, again via the user interface as indicated at box 61. The peer connect algorithm 15 (FIG. 5) then sends an email to the recipient peer indicating that someone wants to contact the recipient and disclosing various information about the requester such as, for example, the requester's company, industry, role in the company/industry and a personal message from the requester. The requester's personal information, such as name, email address, etc. is not disclosed at this time.

Upon receipt of the email, the recipient peer 50 reviews the connection request using a provided user interface, as indicated at box 62. If the recipient decides not to accept the request for a connection with the requester (box 63), a connection rejection is sent as indicated at box 67. This rejection can comprise an email sent to the requester that the connection has been refused. The system can keep a record to note that the recipient peer has rejected a communication, which record can be used to provide a corresponding bias with respect to that recipient peer (as described in connection with box 52 of FIG. 4) should that recipient continue to refuse connections when contacted.

If the recipient peer 50 accepts the request for a connection, a connection acceptance is sent to the requester 10, as indicated at box 64. The acceptance can comprise an email sent to the requester indicating that the connection has been accepted. A record can be kept by the system regarding the acceptance by the particular recipient peer, for future use in providing a corresponding bias as described in connection with box 54 of FIG. 4.

Upon acceptance of the connection request by the recipient, an introductory email is sent by the application on server 12 to both the recipient and requester with the contact information of both parties. Alternatively, the requester can also review the connection status (box 65) and obtain contact information of the recipient peer via the user interface. At this point, the requester can directly contact the recipient peer to commence a business relationship. For example, the requester can ask the recipient peer to provide advice and/or assistance in a particular technology or subject area, or to collaborate on a project that the requester is working on. In one embodiment of the system, the recipient peer 50 will be able to obtain contact information for the requester via his user interface, as indicated at box 68, as soon as the connection has been accepted by the recipient peer.

It should now be appreciated that the present invention provides an interactive peer directory system that enables professionals to find suitable peers for assistance with, advice on, and/or collaboration on a particular project. Although the peers can be employed by the same company as the requester, they will generally be people that work for other companies or are independent consultants, academics, or the like.

A user interface enables user profile information to be entered and stored in a profiles database. A search engine appends tags to the user profile information. A search index associated with the search engine stores tagged user profile information in an indexed form. A peer relevancy algorithm associated with the search engine searches for candidate peers among the indexed user profile information stored in the search index. The peer relevancy algorithm assigns weights to candidate peers based on different categories of the indexed user profile information, and selects peer matches based on the assigned weights.

Once the system provides one or more potential peer matches to the requester, the requester can initiate a connection request to a selected peer. If the selected peer accepts the connection request, the requester can contact the peer directly. In order to provide matches that are most likely to accept a connection request, the system can keep track of which candidate peers have a history of accepting requests to connect and which have a history of refusing to connect. The list of potential matches provided to the requester can be biased to favor those that have a tendency to accept connection requests.

Although the invention has been described in accordance with a preferred embodiment, various other embodiments can be provided and are intended to be included within the scope of the claims.

What is claimed is:

1. A peer directory system implemented on a digital computer network, comprising:
   a user interface enabling user profile information to be entered and stored in a profiles database;
   a search engine configured to append tags to said user profile information;
   a search index associated with said search engine for storing tagged user profile information in an indexed form; and
   a peer relevancy algorithm associated with said search engine to search for candidate peers among the indexed user profile information stored in said search index;
   said peer relevancy algorithm assigning weights to candidate peers based on different categories of the indexed user profile information and selecting peer matches based on said weights wherein:
said search index stores information indicative of past connection responses for candidate peers; and
said peer relevancy algorithm provides:
(a) a negative bias to candidate peers that have poor past connection responses, and
(b) a positive bias to candidate peers that have good past connection responses.

2. The peer directory system according to claim 1 wherein a first weight is assigned to candidate peers who have a best initiative match with a user searching for peers.

3. The peer directory system according to claim 2 wherein a second weight is assigned to candidate peers who have a best vendor/product match with said user searching for peers.

4. The peer directory system according to claim 3 wherein a third weight is assigned to candidate peers who have a best primary operating system (OS) match with said user searching for peers.

5. The peer directory system according to claim 4 wherein a fourth weight is assigned to candidate peers who have a best industry match with said user searching for peers.

6. The peer directory system according to claim 5 wherein a fifth weight is assigned to candidate peers who have a best firm size match with said user searching for peers.

7. The peer directory system according to claim 6 wherein:
said first, second, third, fourth and fifth weights are summed across all tags for the candidate peers to provide a composite weight for each candidate peer; and
the candidate peers are sorted by their composite weights.

8. The peer directory system according to claim 1 wherein said user interface comprises a display processor for providing display information indicative of best matched peers and allowing information about said best matched peers to be viewed and filtered by a user searching for peers.

9. The peer directory system according to claim 1 wherein said peer relevancy algorithm assigns weights to candidate peers based on at least one of best initiative match, best vendor match, best product match, best primary operating system (OS) match, best industry match and best firm size match.

10. The peer directory system according to claim 9 wherein:
weights assigned to candidate peers are summed for each such peer, and
the candidate peers are sorted by their composite weights.

11. The peer directory system according to claim 1 wherein:
said peer relevancy algorithm is responsive to a request entered via said user interface to select a peer match for a requester and to return peer matches to the requester via said user interface, and
said user interface enables the requester to request connection to one or more peers identified by the peer matches;
said peer directory system further comprising:
a communications processor responsive to a peer connection requested by the requester for:
(i) generating a connection request message to the applicable peer,
(ii) receiving a reply from said applicable peer,
(iii) if the applicable peer accepts the connection, sending a connection acceptance to the requester with contact information for the applicable peer, and
(iv) if the applicable peer fails to accept the connection, sending a connection rejection to said requester.

12. The peer directory system according to claim 11 wherein said peer relevancy algorithm assigns weights to candidate peers based on at least one of best initiative match, best vendor match, best product match, best primary operating system (OS) match, best industry match and best firm size match.

13. The peer directory system according to claim 12 wherein:
weights assigned to candidate peers are summed for each such peer, and
the candidate peers are sorted by their composite weights.

14. The peer directory system according to claim 11 wherein:
the connection request message discloses at least one of the requester's company, industry, role or a personal message from the requester without disclosing the identity of the requester, and
contact information for the requester is disclosed to the applicable peer only if the applicable peer accepts the connection.

15. The peer directory system according to claim 1 wherein:
said user interface allows a user to filter peer matches by at least one of industry, firm size, country, job role, vendor, product/service category and for peers working within the same company.

16. The peer directory system according to claim 1, wherein said weights are configurable.

17. The peer directory system according to claim 16 wherein said negative bias and said positive bias are configurable.

18. The method for connecting peers having common interests, comprising the steps of:
enabling user profile information to be collected;
appending tags to said user profile information;
storing tagged user profile information in a profiles database in an indexed form;
searching said profiles database to identify candidate peers in response to a request for a peer match, the identification of candidate peers being based on correlations between a requester's user profile information and user profile information for the candidate peers;
assigning weights to the candidate peers;
selecting peer matches based on said weights;
storing information indicative of past connection responses for candidate peers; and
providing:
(a) a negative bias to candidate peers that have poor past connection responses,
(b) a positive bias to candidate peers that have good past connection responses.

19. The method in accordance with claim 18 wherein:
the weights assigned to candidate peers are based on at least one of best initiative match, best vendor match, best product match, best primary operating system (OS) match, best industry match and best firm size match;
the weights assigned to candidate peers are summed for each such peer; and
the candidate peers are sorted by their composite weights.

* * * * *